Jan. 3, 1939.　　　R. H. CROUCH　　　2,142,303
COMBINED CUT-OFF AND MITER SAW
Filed Sept. 28, 1935　　　4 Sheets-Sheet 4
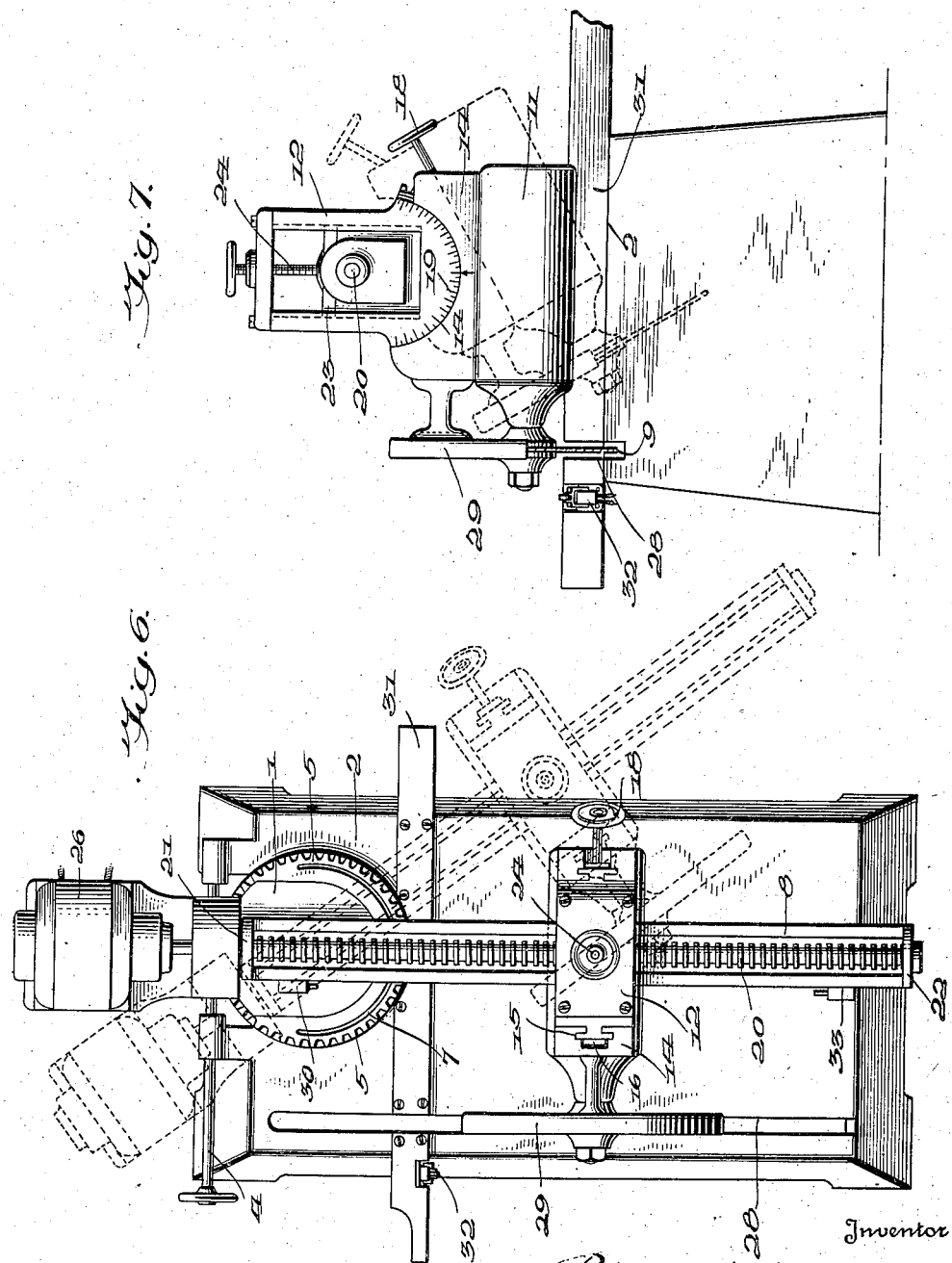

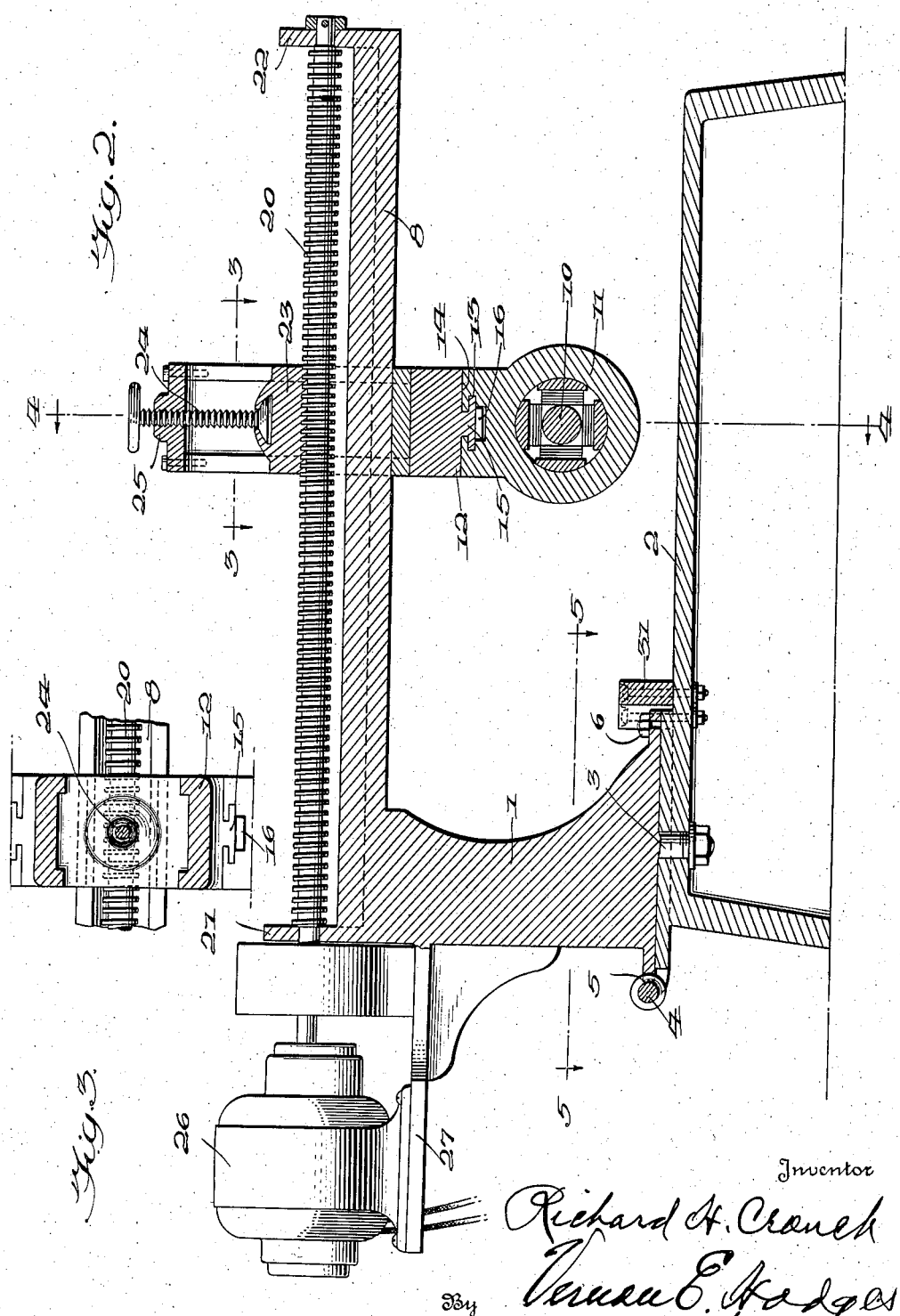

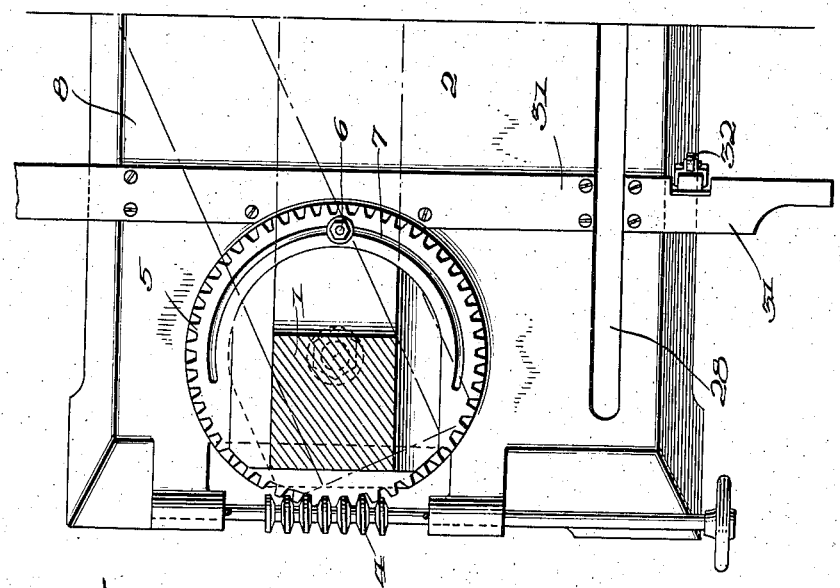
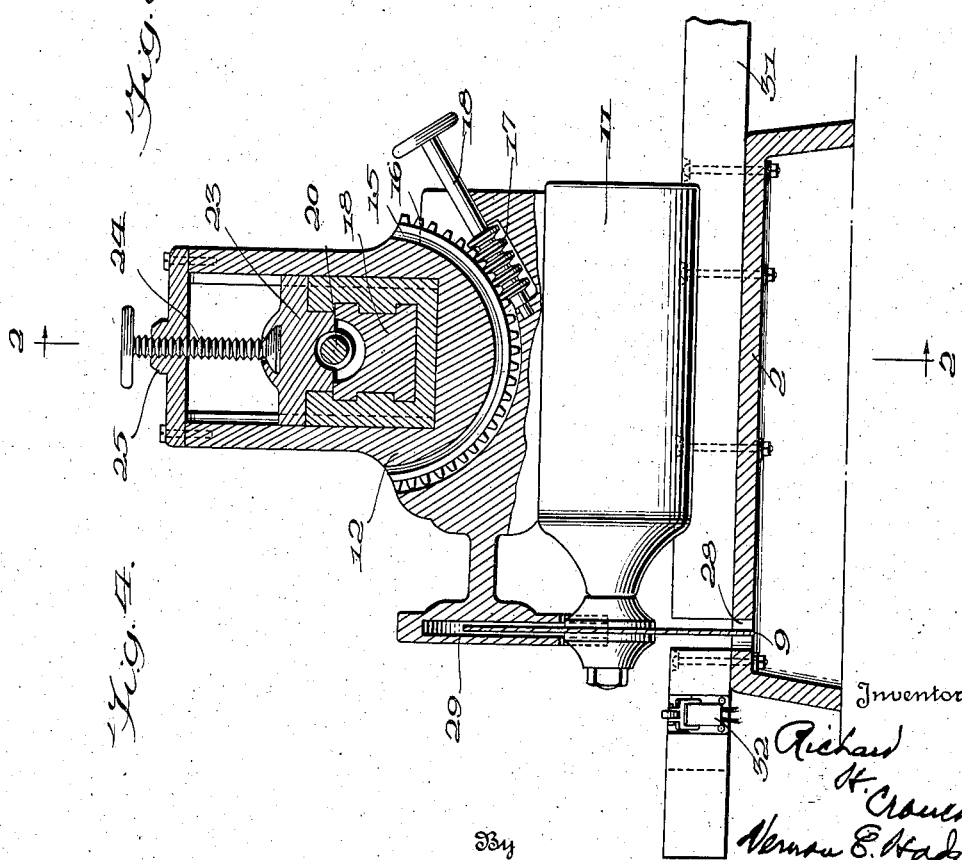

Patented Jan. 3, 1939

2,142,303

UNITED STATES PATENT OFFICE 2,142,303

COMBINED CUT-OFF AND MITER SAW

Richard H. Crouch, Pulaski, Va., assignor, by direct and mesne assignments, to Automatic Machinery Corporation, Pulaski, Va., a corporation of Virginia Application September 28, 1935, Serial No. 42,702

2 Claims. (Cl. 143—6)

My invention relates to an improvement in combined cut-offs and miter saws.

The advantage this invention has over the old type of cut-off saw is that it works automatically. One operator can cut from three to four times as many feet of lumber per day as has ever been cut by any machine now on the market.

Consequently, one object is to speed up production and produce a machine of greater capacity and output than has hitherto been known on the market without increasing the cost of operation.

A further object is to provide a machine which may be produced at a much smaller cost than hitherto.

Another marked advantage of the present invention is that both hands of the operator are free, the machine being entirely automatic (whereas with the old type of machine the operator has only one hand to use in handling the lumber) and in consequence he does not have to touch the machine and is enabled to handle at least three times as much lumber with his two hands as could be handled with one hand.

With these and other objects in view, the present invention might be termed a two-way or what is known as a compound miter, which means ability to swing the supporting arm all the way up to an angle of 45° from normal, and also to adjust the saw itself at different angles with ability to cut at any angle or degree desired up to 45°.

In the accompanying drawings:

Fig. 2 is an enlarged longitudinal vertical section through the line 2—2 of Fig. 4, looking in the direction of the arrows;

Fig. 3 is a horizontally sectional view on the line 3—3 of Fig. 2 looking in the direction of the arrows;

Fig. 4 is a transverse vertical section on the line 4—4 of Fig. 2 looking to the left in the direction of the arrows;

Fig. 5 is a horizontal section on the line 5—5 of Fig. 2 looking in the direction of the arrows;

Fig. 6 is a top plan view of the entire machine on substantially the scale illustrated in Fig. 1; and Fig. 7 is a view in front elevation.

Figure 1:
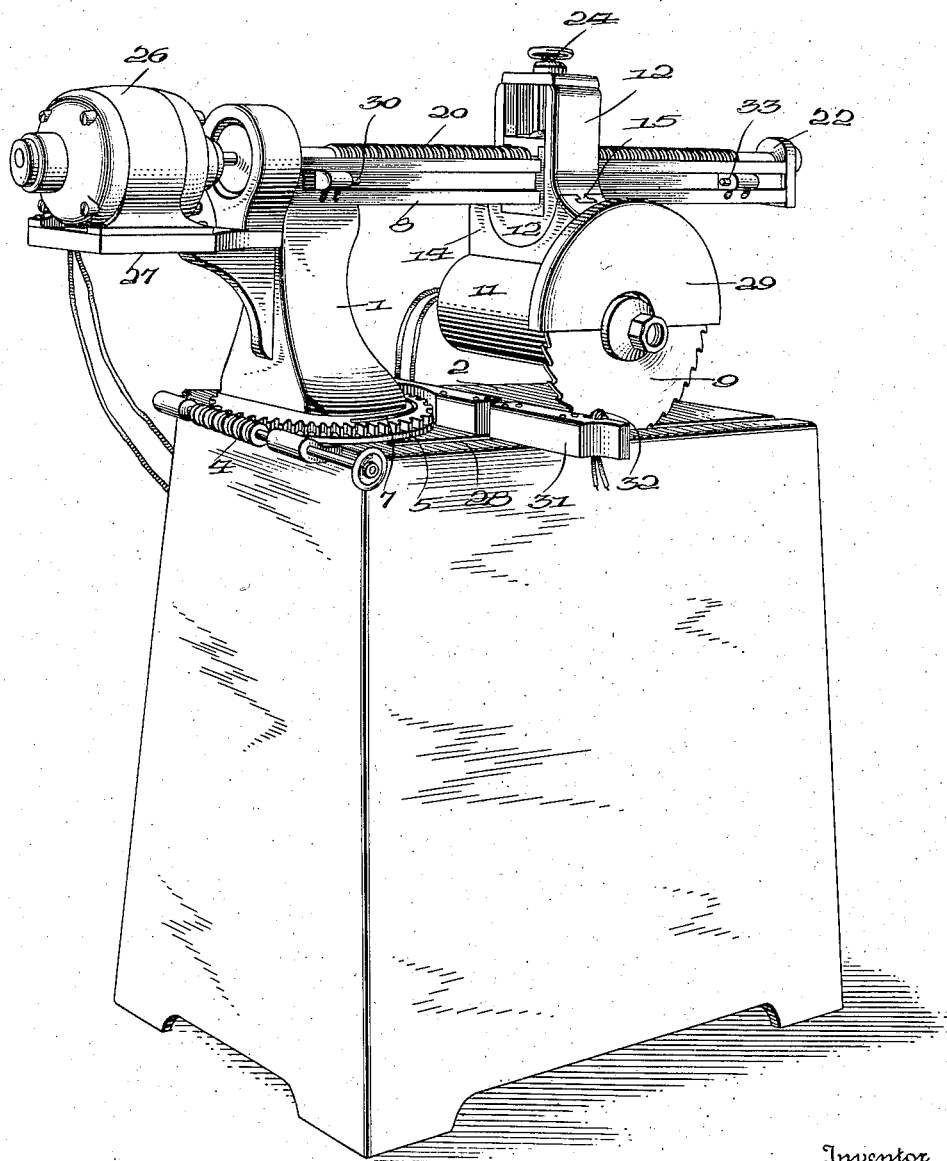
Fig. 1 is a view in perspective.

A post or pedestal 1 is mounted on the bed 2 of the machine so that it may be turned and adjusted axially with the bolt 3 as a center (see Fig. 2), and while various means of adjustment might be provided, a simple method of swinging and locking the post or pedestal is afforded through the worm 4 and worm-gear 5, and to insure against the slightest movement or vibration, a bolt 6 passes through the arcuate slot 7 in the base of the post or pedestal 1 and into the bed 2, as clearly illustrated in Figs. 2 and 5, it being tightened up after any adjustment to insure rigidity.

An arm 8 is preferably formed integral with the top of the post or pedestal 1, as is clearly shown in Fig. 2, and the saw 9 with its operating motor 10, and the motor housing 11, is adjustably supported on the lower semi-circular edge of the yoke 12 through the medium of the T-shaped groove 13 in the semi-circular edge of the saddle 14 formed in the upper edge of the motor housing 11, and this T-shaped slot receives a correspondingly T-shaped rib 15 on the lower semi-circular edge of the yoke 12, and this semi-circular lower edge is provided with worm-teeth 16, and a worm 17 on the shaft 18 controls the angular adjustment of the saddle and consequently the cant of the saw 9.

By turning the worm-shaft 18, the saw and its miter and miter-casing may be adjusted all the way from vertical to an angle of 45° (see Fig. 7), and to measure this adjustment the graduations 19 are provided on the lower semi-circular edge of the yoke 12.

The saw is fed back and forth on the supporting arm 8 by means of the threads of the worm 20, the ends of which worm are swiveled in the bearings 21 and 22.

The threads of the worm extend through a threaded orifice in a block 23, the ends of which are guided for vertical adjustment in the vertical sides of the yoke 12, as shown in Figs. 3 and 4, the adjustment taking place through a screw 24 swiveled in the block 23, and threaded in the boss 25 at the top of the yoke. This screw 24 is turned to the right or left to bodily raise or lower the saw with respect to its supporting yoke 12. Screw 20 is driven by a motor 26 on the shelf 27 extending from the post or pedestal 1.

A reference to Figs. 6 and 7 will show in full and dotted lines how the saw 9 will admit of two adjustments, in other words, a compound miter adjustment, which adjustments are made by the worms 4 and 18. When in its normal position, the saw is located in and adapted to traverse the channel 28 (see Fig. 6). For protection to the operator, the saw has a guard 29 over it.

To render the action automatic, the several electric switches are provided; the switch 30 is a stop switch, and when the yoke 12 strikes it the motor 26 stops automatically, although the saw continues to revolve. Before engaging the switch, the saw 9 is backed to the rear end of the channel 28, back of the gauge-block 31 which latter is secured transversely on the bed of the machine.

On the forward face of the gauge block 31, an electric starting and reversing switch 32 is placed, and on the outer end of the arm 8 a reversing switch 33 is located. The purpose of these three switches is readily apparent. The operator places the stock against the gauge block 31. As he does this, it closes the switch 32 which automatically starts the motor 26. As a result, the saw is fed steadily outward toward the forward end of the machine, and the moment the pressure is released from switch 32 the motor is automatically stopped and reversed, and the saw returns to and engages the switch 30, automatically stopping the motor 26, and the saw remains in that position until another stick of wood is held against the switch 32 when the operation is repeated; but if the operator should absent-mindedly or inadvertently continue to hold the stick against the switch 32 after it shall have been sawed through, then the saw continues its travel outward until the switch 33 is struck. This might well be termed a safety switch as it immediately stops and reverses the motor 26 automatically and the saw is returned to its normal starting point.

Thus I have provided an entirely automatic machine which is quick in operation, requires no handling on the part of the operator, starts and stops automatically, will cut upwards of seventy-five thousand (75,000) feet of lumber a day as against twenty thousand (20,000) feet heretofore, and all with the attention of a single operator, capable of miter-cutting and cutting on a bias, and with a provision for swinging the arm in order to get the required degree of side swing, thus providing a two-way miter known as a compound miter, which means ability to swing the arm as high as 45° from normal, as well as the saw itself the same amount.

The saw with the machine will cut as high as one hundred and sixty (160) feet per minute, which means nine thousand six hundred (9600) feet per hour.

I claim:

1. The combination of a pedestal, an arm, a screw rotatably supported by the arm, a yoke mounted on the arm for adjustment on the arm lengthwise the latter through turning of the screw, said yoke having a semi-circular lower edge with a worm gear thereon, a motor, a saw rotatably operated thereby, a motor-housing, a semi-circular saddle formed in the upper edge of the housing which fits and turns on the semi-circular lower edge of the yoke, a worm rotatably connected with the motor housing for turning and adjusting and locking the latter, whereby to adjust the angle of the saw.

2. The combination of a pedestal, an arm, a screw rotatably supported by the arm, a yoke mounted on the arm for adjustment on the arm lengthwise the latter through turning of the screw, said yoke having a semi-circular lower edge with a worm gear thereon, a motor, a saw rotatably operated thereby, a motor-housing, a semi-circular saddle formed in the upper edge of the housing which fits and turns on the semi-circular lower edge of the yoke, a worm rotatably connected with the motor housing for turning and adjusting and locking the latter, whereby to adjust the angle of the saw, and a worm and worm gear for turning, adjusting and locking the pedestal on its support.

RICHARD H. CROUCH.